No. 755,167. PATENTED MAR. 22, 1904.
W. P. PHILLIPS.
CARBURETER.
APPLICATION FILED SEPT. 26, 1903.
NO MODEL.

Witnesses

William P. Phillips,
Inventor.
by C. A. Snow & Co
Attorneys

No. 755,167. Patented March 22, 1904.

UNITED STATES PATENT OFFICE.

WILLIAM PATRICK PHILLIPS, OF JACKSONVILLE, FLORIDA, ASSIGNOR OF ONE-HALF TO MARCUS SCOTT, OF JACKSONVILLE, FLORIDA.

CARBURETER.

SPECIFICATION forming part of Letters Patent No. 755,167, dated March 22, 1904.

Application filed September 26, 1903. Serial No. 174,806. (No model.)

*To all whom it may concern:*

Be it known that I, WILLIAM PATRICK PHILLIPS, a citizen of the United States, residing at Jacksonville, in the county of Duval and State of Florida, have invented a new and useful Carbureter, of which the following is a specification.

This invention relates to that class of devices which are generally known as carbureters and which are for the purpose of producing oil-gas or carbureted air for illuminating and heating purposes.

My invention has for its object to provide a carbureter and a pipe system for conveying air from a suitably-arranged blower through a tank containing hydrocarbon oil, the air thus impregnated or carbureted being conveyed to a jacket constituting a mixing-chamber, where an additional amount of air is supplied, thus producing a hydrocarbon gas suitable for consumption by means of ordinary burners either for heating or illuminating purposes.

My improved carbureter and pipe system is especially adapted to be used in laundry plants where numerous machines, such as ironing-machines and the like, require to be constantly heated and where gas for illuminating purposes is also constantly required. It is understood, however, that my invention may be applied to any purposes for which it may be deemed suitable and desirable.

Figure 1:
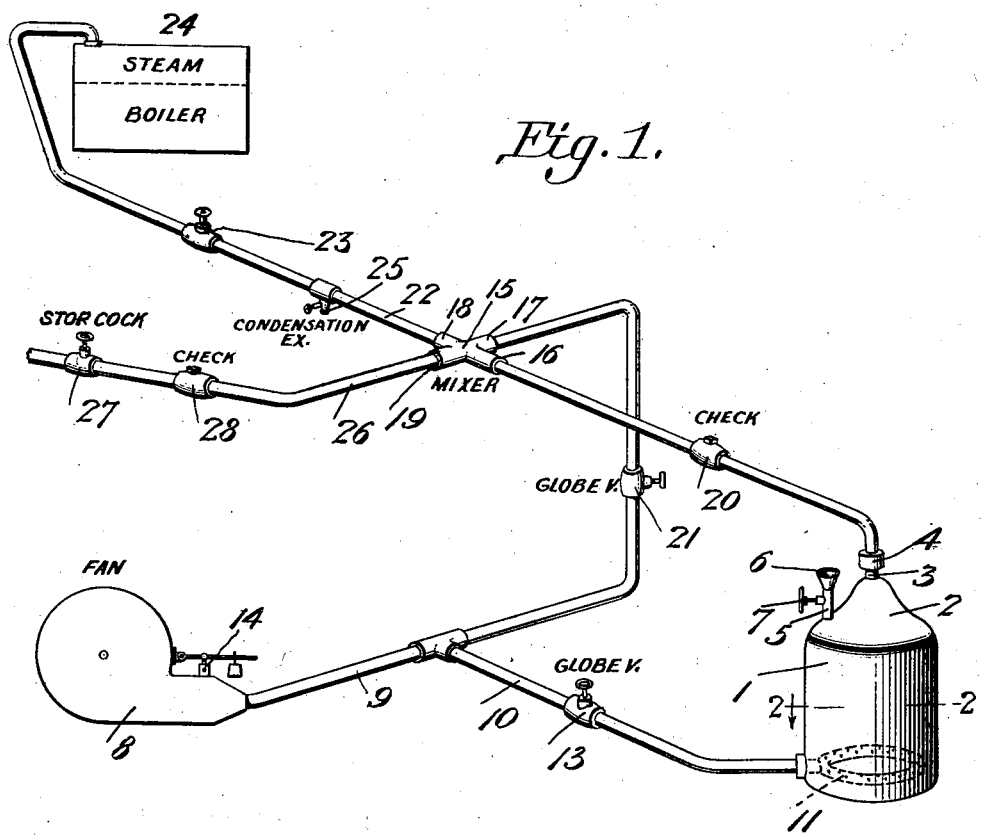
Figure 2:
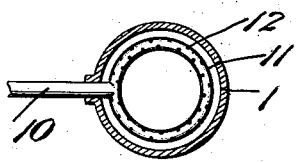

In the accompanying drawings, Figure 1 is a diagrammatic view illustrating my invention. Fig. 2 is a horizontal sectional view taken through the oil-tank on the line 2 2.

Corresponding parts in both figures are indicated by similar numerals of reference.

The oil-tank, which is designated 1, is in practice located outside the building in which the gas is to be utilized, and said tank is provided with a dome 2, with which the outlet-pipe 3 is suitably connected—as, for instance, by means of a flange-union 4. The tank 1 is provided with a filling-pipe 5, having a funnel 6 and a valve 7, which may be tightly closed.

8 designates a blower the outlet of which is connected with a pipe 9, having a branch 10, which enters the tank 1, near the lower end of the latter, and which terminates within the tank in a coil 11, having a plurality of perforations 12. The pipe 10 is also provided with a globe-valve 13, by means of which the amount of air permitted to enter the tank 1 may be regulated. The blower is also provided with a safety-valve (conventionally indicated at 14) in order to prevent an excess of pressure at any time.

The exit-pipe 3 of the tank 1 is connected with a four-way coupling 15, having branches or inlets 16, 17, 18, and 19, one of which, 16, is connected, as described, with the pipe 3, in which latter an automatic check-valve 20 is disposed to prevent back pressure into the tank. The pipe 9, leading from the blower and the branch of which, 10, is connected with the bottom of the oil-tank, is extended to and connected with a branch 17 of the four-way coupling 15, which constitutes the mixing-chamber, and said pipe 9 is provided at a point intermediate the branch 10 and the mixing-chamber with a globe-valve 21. The branch 18 of the mixing-chamber is connected by a pipe 22, having a valve 23, with the steam-space of the boiler, (conventionally indicated at 24.) This pipe is only utilized in extremely cold weather when the flow of the gas through the pipes is checked or interfered with by excessive cold. The valve 23 may then be opened for the purpose of causing the steam to heat the pipes, and when this has been accomplished the valve 23 is again closed and water of condensation accumulating in the pipe 22 may then be drawn off through an outlet 25. The branch 19 of the mixing-chamber is connected with a pipe 26, having a stop-cock or valve 27 and provided between said stop-cock or valve and the mixing-chamber with an automatic check-valve 28 to prevent back pressure in the pipe 26, from which the gas is conveyed or piped to the various machines and illuminating-burners where it is to be consumed.

The operation of this invention and the practical advantages of the same will be readily understood from the foregoing description, taken in connection with the drawings hereto annexed. When the blower is started in operation, the stop-cock 27 is closed and air is forced through the pipe 10 and the perforated distributing-coil of the latter into the lower end of the tank 1 at a point below the surface of the body of fluid hydrocarbon contained in the latter. It may be incidentally stated that the tank is preferably located below the level of the blower and that in case it should be located above said level it might be necessary to place a check-valve between the globe 13 and the tank; also, that gasolene or some other light hydrocarbon is preferably used in connection with this device. The air being forced under pressure through the body of hydrocarbon becomes impregnated therewith or carbureted, the carbureted air escaping through the pipe 3. In the condition in which it escapes from the tank 1, however, the carbureted air will be found too heavily impregnated to be successfully used. In other words, in this condition a smoky flame will result, indicating imperfect combustion. It is to obviate this disadvantage that the pipe 9, connected with the blower, is connected with the mixing-chamber 15, which is also connected with the pipe 20. Through the said pipe 9 a quantity of air, regulated by the globe-valve 21, is admitted to the mixing-chamber and there commingles with the carbureted air passing through the pipe 3 from the tank 1. The mixing-chamber, as previously set forth, has a branch connecting it with the steam-space of the boiler; but this branch is normally closed, and it is through the fourth branch 19 of said mixing-chamber that the diluted gas is piped to the burners when the stop-cock 27 is opened. Said stop-cock, however, is suffered to remain closed until the back pressure against the check-valve 20 causes a pressure in the remaining pipes, whereby the safety-valve 14 is raised from its seat, thereby indicating that all the pipes back of said stop-cock are filled with gas. The stop-cock being now opened the gas will pass to the various lighting-burners, as well as the heating-burners, of the plant, and the quality of gas will quickly be distinguished and adjusted by properly setting the globe-valve 21, which serves as a regulator and which when once set rarely requires to be adjusted. When one or more of the burners of the system is extinguished while other burners are still suffered to consume gas, the increase of the pressure at such burners will react against the check-valve 28, which by thus resisting the passage of gas will cause an increase of pressure in the pipes between itself and the blower, which will speedily result in raising the safety-valve from its seat, thus reducing the generation of gas and reducing the pressure of gas at the burners to normal. It will thus be seen that under all circumstances the generation of gas by my improved system is automatically regulated, the reduction in the generation of the gas taking effect almost instantaneously when the pressure at the burners rises above normal. The stop-cock 27 is not usually operated except during the night or at times when none of the burners of the system are in use.

The safety-valve 14 at all times prevents a surplus of air from passing to the mixing-chamber either directly or through the carbureting-tank, and by means of the globe-valve 21, which may be described as the regulating-valve of the system, the quantity of air passing through the pipe 9 to the mixing-chamber may be perfectly regulated, and when once set this valve usually requires no further attention.

I desire it to be understood that while I have herein described a simple and preferred construction I do not necessarily limit myself to the precise structural details herein described, but reserve the right to any changes, alterations, and modifications which may be resorted to within the scope of my invention and without departing from the spirit or sacrificing the utility of the same.

Having thus described my invention, I claim—

1. In a device of the class described, a tank having a dome, a pipe connecting said dome with one branch of a mixing-chamber, a blower having a safety-valve, a pipe connecting the outlet of said blower with a second branch of the mixing-chamber, a globe-valve upon said pipe, a branch pipe connecting said pipe between the blower and the globe-valve with the tank and terminating within the latter in a coil having a plurality of perforations, a globe-valve upon the latter pipe regulating the amount of air passing from the blower to the tank, a check-valve upon the exit-pipe from the tank, an exit-pipe connected with a third branch of the mixing-chamber, a regulating-valve upon said exit-pipe, a valved steam-supply pipe connected with a fourth branch of the mixing-chamber, and an outlet for water of condensation situated upon said steam-supply pipe between the valve on the latter and the mixing-chamber.

2. In a device of the class described, a hydrocarbon-tank, a blower, and a mixing-chamber suitably disposed with relation to each other, a valved connection between the blower and the mixing-chamber, a valved branch pipe connecting the blower-pipe with the hydrocarbon-tank near the lower end of the latter, said branch pipe being connected with the blower-pipe at a point between the valve upon the latter and the blower, a pipe connection between the top of the hydrocarbon-tank and the mixing-chamber, a check-valve in the latter pipe, means for distributing carbureted air from the mixing-chamber, and a valved pipe connecting the mixing-chamber with a source of steam-supply.

In testimony that I claim the foregoing as my own I have hereto affixed my signature in the presence of two witnesses.

WILLIAM PATRICK PHILLIPS.

Witnesses:
WALTER H. RICHARDSON,
EDWARD A. SMITH.